United States Patent
Blicharski et al.

(10) Patent No.: US 10,303,386 B2
(45) Date of Patent: May 28, 2019

(54) DATA PROCESSING DEVICE AND METHOD FOR SAVING POWER IN A DATA PROCESSING DEVICE

(71) Applicant: Infineon Technologies AG, Neubiberg (DE)

(72) Inventors: Peter Blicharski, Essen (DE); Witold Gora, Unterhaching (DE); Leong Kee Chee, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/607,710

(22) Filed: May 30, 2017

(65) Prior Publication Data

US 2017/0344302 A1    Nov. 30, 2017

(30) Foreign Application Priority Data

May 30, 2016   (DE) .......................... 10 2016 109 892

(51) Int. Cl.
*G06F 1/32*   (2019.01)
*G06F 3/06*   (2006.01)
*G06F 9/4401*   (2018.01)

(52) U.S. Cl.
CPC .......... *G06F 3/0634* (2013.01); *G06F 3/0625* (2013.01); *G06F 3/0658* (2013.01); *G06F 9/4418* (2013.01); *Y02D 10/44* (2018.01)

(58) Field of Classification Search
CPC ............................. G06F 3/0625; G06F 3/0658
See application file for complete search history.

(56) References Cited

U.S. PATENT DOCUMENTS

| | | | |
|---|---|---|---|
| 7,681,057 B2 | 3/2010 | Payne | |
| 2002/0116651 A1 | 8/2002 | Beckert et al. | |
| 2007/0112899 A1* | 5/2007 | Edwards | G06F 9/4418 |
| 2007/0288772 A1* | 12/2007 | Li | G06F 1/3203 |
| | | | 713/300 |
| 2008/0022108 A1 | 1/2008 | Brannock et al. | |
| 2008/0082845 A1* | 4/2008 | Morisawa | G06F 1/3203 |
| | | | 713/323 |
| 2011/0022826 A1 | 1/2011 | More et al. | |
| 2011/0314185 A1* | 12/2011 | Conroy | G06F 1/3203 |
| | | | 710/22 |
| 2014/0082724 A1* | 3/2014 | Pearson | G06F 21/575 |
| | | | 726/22 |

* cited by examiner

*Primary Examiner* — Ryan Bertram
*Assistant Examiner* — Trang K Ta
(74) *Attorney, Agent, or Firm* — Viering, Jentschura & Partner MBB

(57) ABSTRACT

According to one embodiment, a data processing device is described including a non-volatile memory configured to store configuration data for the data processing device, a volatile memory and a control system configured to copy the configuration data from the non-volatile memory to a section of the volatile memory, block writing to the section of the volatile memory and to put the data processing device into a hibernation mode in which the non-volatile memory is inactive and the volatile memory is active.

20 Claims, 6 Drawing Sheets

DATA PROCESSING DEVICE AND METHOD FOR SAVING POWER IN A DATA PROCESSING DEVICE

CROSS-REFERENCE TO RELATED APPLICATION

This application claims priority to German Patent Application Serial No. 10 2016 109 892.2, which was filed May 30, 2016, and is incorporated herein by reference in its entirety.

TECHNICAL FIELD

The present disclosure relates to data processing devices and methods for saving power in a data processing device.

BACKGROUND

In electronic devices such as microcontrollers or communication devices, power consumption is a typical issue, e.g. in cases where the energy source has limited current capability. Therefore, measures to reduce power consumption such as power saving modes are typically introduced in such electronic devices. However, there may be components which are not well-suited with regard to low power capabilities, e.g. a flash memory. Accordingly, approaches to reduce power consumption in such scenarios are desirable.

SUMMARY

According to one embodiment, a data processing device is provided including a non-volatile memory configured to store configuration data for the data processing device, a volatile memory and a control system configured to copy the configuration data from the non-volatile memory to a section of the volatile memory, to block writing to the section of the volatile memory and to put the data processing device into a hibernation mode in which the non-volatile memory is inactive and the volatile memory is active.

According to another embodiment, a method for saving power in a data processing device according to the data processing device described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
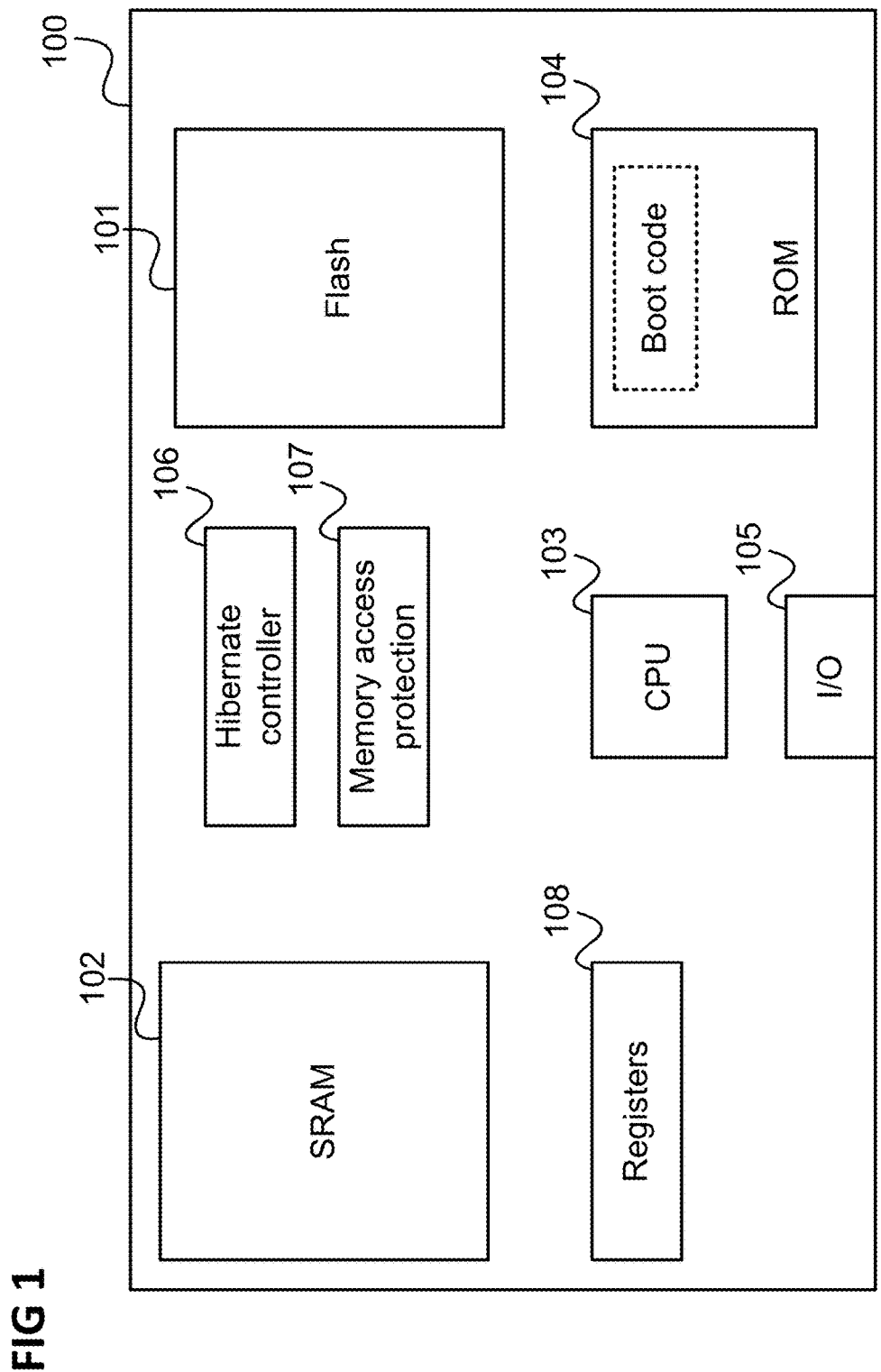
FIG. 1 shows a microcontroller.

FIG. 1 shows a microcontroller 100.

The microcontroller 100 includes a non-volatile memory (NVM) 100, in this example a flash memory 101, and a volatile memory 102, in this example an SRAM (static random access memory) which is for example the microcontroller's main memory Flash is a type of EEPROM (electrically erasable programmable read-only memory) that supports read, program, and erase as its basic operations. A NAND flash memory chip typically includes command status registers, a control unit, a set of decoders, some analog circuitry for generating high voltages, buffers to store and transmit data, and the memory array. An external memory controller sends read, program or erase commands to the chip along with the relevant physical address. The main component of a NAND flash memory chip is the flash memory array. A flash memory array is organized into banks (referred to as planes) which is a two dimensional grid composed of rows (bitlines) and columns (wordlines). At the intersection of each row and column there is a floating gate transistor (FGT) which stores a logical bit of data.

When the flash memory being active (or on) but is not performing any operation (i.e. no read, erase or write operation), it is in a precharge state. In this state, the bitlines are precharged while the wordlines and the select lines are grounded. The select lines isolate the memory cell array electrically but the memory is ready to respond to commands from its memory controller.

The microcontroller 100 further includes a processor (central processing unit CPU) 103 and a read-only memory (ROM) 104 storing a boot code which the processor 103 executes when the microcontroller 100 is started, following a reset of the microcontroller 100 or when the microcontrollers 100 wakes up, i.e. leaves hibernate mode as described below.

The microcontroller may have further components such as an I/O (input output) circuit 105 e.g. including various interfaces and I/O ports, one or more coprocessors (not shown) etc.

The microcontroller 100 may for example be used in an automotive or industrial application and may for example be located in a machine such as for motor control etc.

An important issue with respect to a microcontroller such as the microcontroller 100 of FIG. 1 is power consumption. In various embodiments, the energy consumption of the non-volatile memory 101, e.g. flash memory, plays a significant role. Approaches to minimize active current consumption may rely on dedicated low power chip manufacturing technologies and dedicated low power design solutions, e.g. use of FRAM (ferroelectric RAM), MRAM (magnetic RAM), RRAM (resistive RAM) as non-volatile memory 101 or low power techniques utilizing sub-threshold switching. However, dedicated low power technologies often require a high investment in the technological process and intellectual property. Some performance aspects may be also compromised as a result of power consumption optimization.

According to various embodiments, a low power support is provided that can compensate for non-optimized technology weaknesses in terms of low power capability like e.g. flash power consumption. Embodiments allow achieving attractive low peak and average current levels in context of a microcontroller design based on a technology that is not optimized for low power or ultra-low power. Embodiments enable ultra-low power applications utilizing microcontrollers manufactured using standard technology to be supplied from a source of limited current capability (low mA range) e.g. a coin battery or a capacitor.

Embodiments are for example based on a mechanism that allows combining a so-called hibernate mode, also referred to as e.g. standby mode of ultra-low current consumption mode, with a wake-up into an (e.g. ultra-low power) active operation mode of a microcontroller (e.g. microcontroller 100). The current consumption of a non-volatile memory typically constitutes a considerably high portion of the overall system current consumption in case of e.g. flash memory. According to various embodiments, as described in the following, the system (e.g. microcontroller 100) periodically wakes up and executes a small portion of user code without a need to power-up and configure the NVM, hence, keeping the power consumption very low while in active mode, e.g. below 1 mA, and, e.g. having a hibernate current in the range of a few μA.

According to one embodiment, the microcontroller 100 enters (e.g. from a hibernation mode) into a mode of execution of user application code without the NVM 101 being active (referred to as NVM-less active mode) and starts execution of the user application code located in a section of the SRAM 102 (serving as dedicated retention RAM) which retains configuration data and the user application code (i.e. the user program) during hibernate mode. During hibernate mode, a large part of the microcontroller 100 (such as the CPU 103 and the I/O circuit 105) is powered off. Upon a wake-up (from hibernation mode) the configuration data and the user application code is available in the section of the SRAM 102 which is previously initialized with this data and is write-protected after initialization. The NVM 101 can be kept powered down during the wake-up, during device configuration according to the configuration data following the wake-up and during the application code execution. Still, the data processing device may according to one embodiment also enter an active mode with active NVM, e.g. from hibernate mode or from NVM-less active mode.

The protected RAM, i.e. the SRAM 102 in this example, may for example, contain, in addition to the configuration data, a small amount of executable code copied from the NVM 101 that is executed periodically upon wake-up (to NVM-less active mode) in order to ensure some usable function and to assess if a full blown wake-up (to active mode with active NVM) is required in order to perform a more complex code execution.

Figure 2:
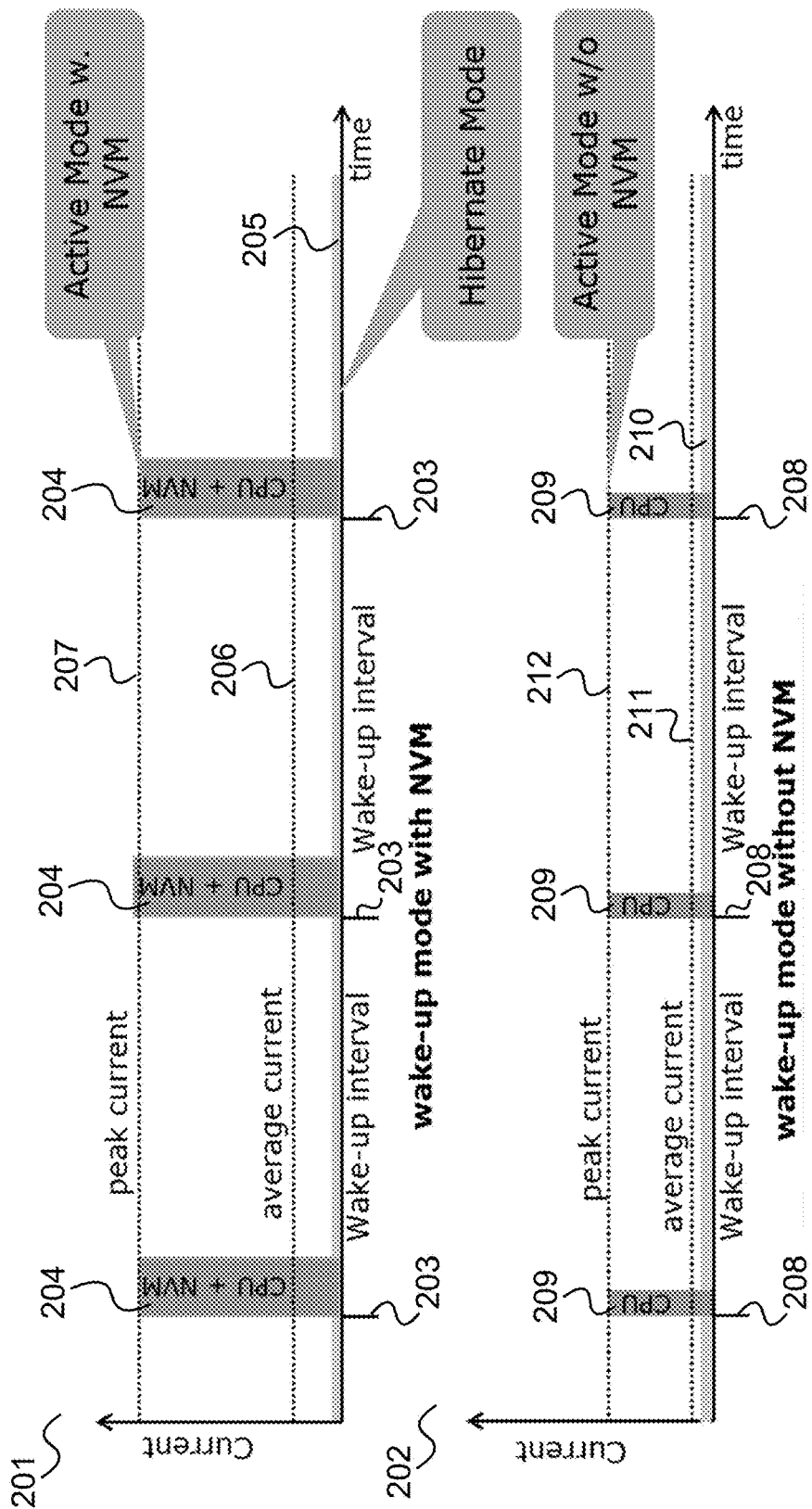
FIG. 2 shows a comparison between power consumption of active mode with active non-volatile memory and power consumption of active mode with inactive non-volatile memory.

FIG. 2 shows a comparison between power consumption of active mode with active non-volatile memory and power consumption of active mode with inactive non-volatile memory (i.e. NVM-less active mode).

The comparison is given by means of two diagrams 201, 202 with similar time scales wherein time increases from left to right along the horizontal axes. Current increases from bottom to top along the vertical axes.

A first diagram 201 illustrates the power consumption in a case of wake-ups from hibernate mode into an active mode with active non-volatile memory at wake-up times 203 separated by wake-up intervals. For example, the wake-up time intervals are in the range of tens or hundreds of milliseconds for a monitoring application, e.g. the microcontroller 100 is to check a sensor value after every wake-up interval. The microcontroller 100 is active (with active NVM) for a certain period after each wake-up time as indicated by first blocks 204 which indicate the current consumption during these active periods. Between these active periods, the microcontroller is in hibernate mode and requires only a low current level 205.

A first dotted line 206 indicates the resulting average current and a second dotted line 207 indicates the peak current (which occurs during the active periods).

A second diagram 202 illustrates the power consumption in a case of wake-ups from hibernate mode into an active mode with inactive non-volatile memory (i.e. into NVM-less active mode) at wake-up times 208 separated by the wake-up intervals. The microcontroller 100 is active (with inactive NVM) for a certain period after each wake-up times as indicated by second blocks 209 which indicate the current consumption during these active NVM-less periods. Between the active NVM-less periods, the microcontroller is in hibernate mode and requires only a low current level 210.

A third dotted line 211 indicates the resulting average current and a second dotted line 212 indicates the peak current (which occurs during the active NVM-less periods).

It can be seen that with a periodic NVM-less wake up the microcontroller 100 consumes less average current than in case of a periodic wake-up with active NVM. Still, the same performance can be maintained.

The microcontroller 100 may include a hibernate controller 106 (e.g. implemented by means of a state machine) which controls the state of the microcontroller 100, i.e. controls whether the microcontroller 100 is in hibernate mode, NVM less active mode or active mode. In various embodiments, the microcontroller may contain (e.g. in the hibernate controller 106) a wake up logic with a mechanism that allows waking up the system (i.e. the microcontroller 100) into a NVM-less mode. The wake up-logic is in hibernate power domain, i.e. it is powered in hibernate mode. As mentioned above, SRAM 102 is also in hibernate power domain while for example the CPU 103 and the I/O circuit 105 are not in hibernate power domain but in active NVM-less power domain, i.e. are powered during active NVM-less mode.

The wake-up may provide an indication of a NVM-less mode wake-up to the startup software (boot code) which handles the wake-up process from hibernate mode (e.g. being executed by CPU 103). The boot code may accordingly implement intelligence required to detect the startup mode (i.e. whether to enter NVM-less active mode or active mode with active NVM) and to execute the initialization of the microcontroller 100 accordingly.

Furthermore, the microcontroller 100 includes a memory access protection hardware 107 which prevents write access to the section of the SRAM which stores the configuration data which has been write-protected, or, in other words, blocks write access to this section of the SRAM. The section of the SRAM which is write-protected may also include user application code, e.g. to allow installing an OEM (Original Equipment Manufacturer) code from another protected location, e.g. from a protected sector of the Flash 101.

The write-protection may for example be implemented by configuring the address decoder of the SRAM 102 to output an error if an address corresponding to the write-protected section is input for a write access. This may also include an erase access. Write accesses to the section of the SRAM (in general a volatile memory of a data processing device) may be generally blocked or may for example blocked for user applications, e.g. executed by a processor of the microcontroller (in general the data processing device). The write protection may also be provided in combination with one or more CPU cores providing corresponding security features.

Furthermore, also the section of non-volatile memory 101 which includes the device configuration data may be blocked from the user (at least for write accesses) before the control is given to the user application code. Further, read access restriction may be applied, e.g. for passing encryption keys that shall be installed in e.g. a security engine by the boot code.

The microcontroller 100 may further include registers 108 which store data when the microcontroller is active (i.e. is in NVM-less active mode or in active mode with NVM). For example the boot code may store information into the registers corresponding to the configuration data, e.g. information indicating voltage levels to be used in the microcontrollers and which functions of the microcontroller are enabled and cryptographic keys used for communication with other devices. The registers 108 may be inactive during hibernate mode, i.e. they lose their contents in hibernate mode.

Figure 3:
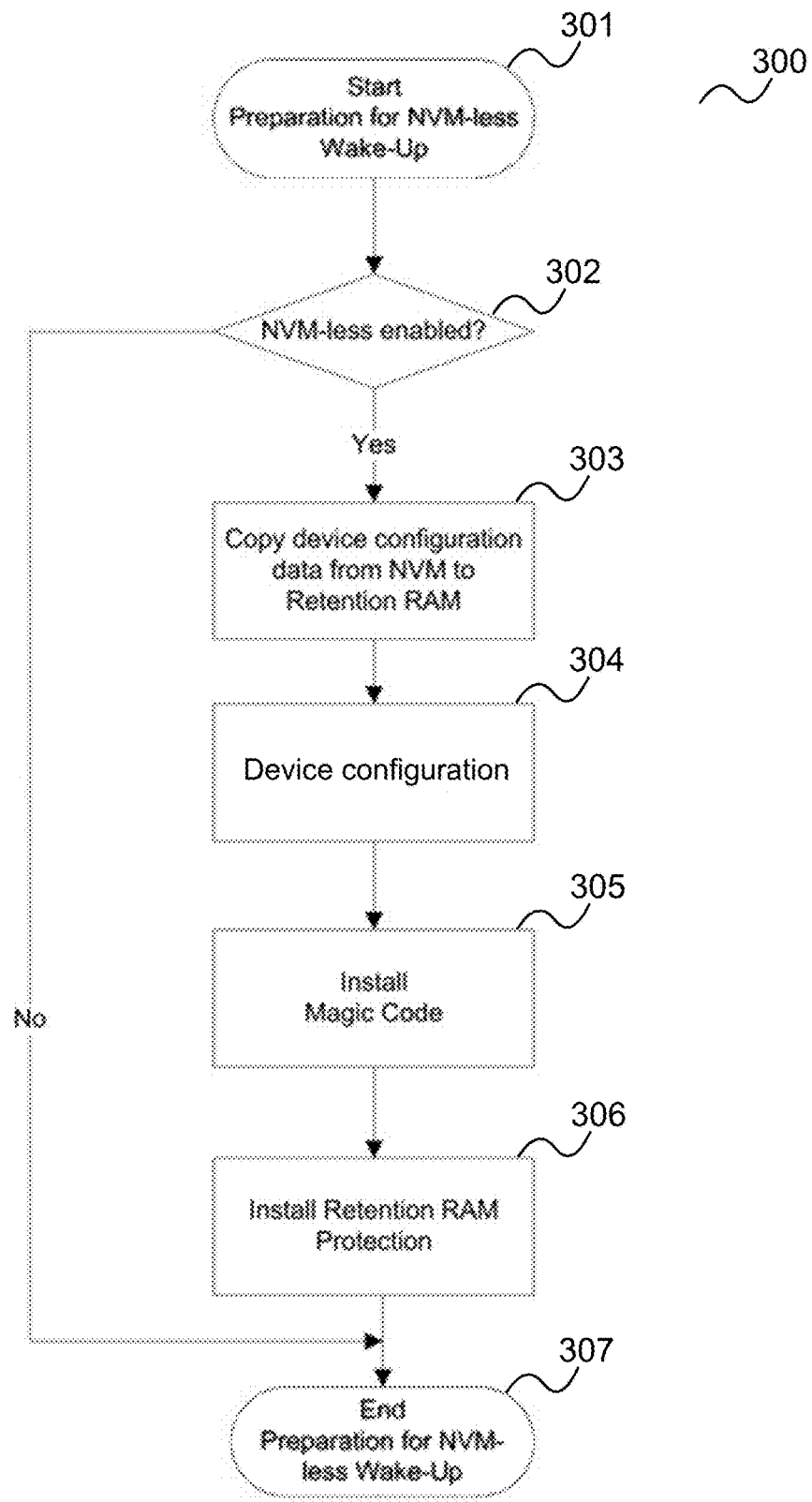
FIG. 3 shows a flow diagram illustrating the preparation of the microcontroller of FIG. 1 for NVM-less wake-up from hibernate mode.

FIG. 3 shows a flow diagram 300 illustrating the preparation of the microcontroller 100 for NVM-less wake-up from hibernate mode.

In 301, the preparation for NVM-less wake-up is started. This may for example happen at initial startup of the microcontroller 100, e.g. when the microcontroller is started after it has been switched off. Initial startup of the microcontroller is performed using the non-volatile memory 101 containing system configuration data and user application code. This means that at initial start-up, the microcontroller is in active mode including active NVM. In various embodiments, the preparation of the microcontroller 100 for NVM-less wake-up is performed in active mode with active NVM.

Upon initial startup, the CPU 103 executes the boot code which checks, in 302, whether NVM-less mode is enabled (as for example indicated in ROM 104 or in the configuration data). If it is not enabled, the process ends in 307. If it is enabled, in 303, the boot code copies the configuration data of the microcontroller from the NVM 101 to a dedicated section of the standby memory (i.e. SRAM 102) during the initial startup.

The configuration data for example includes essential data to configure the clock, complete trimming for modules of the microcontroller and variant configuration. The boot code may accordingly, in 304, configure the microcontroller 100 according to the configuration data. For example, voltage levels and clock timings or frequencies are set, available functions are enabled while unavailable functions are disabled (trimming) and keys are installed. This may happen by writing to corresponding registers 108. The configuration, e.g. the trimming may be limited to functional blocks that are active after wake-up, assuming there are more power domains and not all of them have to be activated. This allows reducing the boot time.

In 305, the boot code appends a magic code to the section storing the configuration data in the SRAM 102. This may be for example be CRC (cyclic redundancy check) bits or a hash value and may serve for integrity protection of the configuration data in the SRAM 102 as well as a unique identifier that the NVM-less mode preparation has been completed. Alternatively, or in addition, a parity check can be utilized on the SRAM 102 to guarantee data consistency after wake up.

Afterwards, in 306, the boot code protects the configuration data in the standby memory by hardware, e.g. by means of the memory access protection hardware 107 before passing control to the user software and cannot be modified by the user software.

NVM-less wake-up is thus completed in 307.

The CPU 103 further installs the user application code in the SRAM 102 before entering hibernate mode. Hibernate mode may then be entered with NVM-less wake up mode being configured. In hibernate mode most of the microcontroller 100 is powered off except for the wake-up logic or hibernate controller 106 and the SRAM 102 containing the configuration data.

Figure 4:
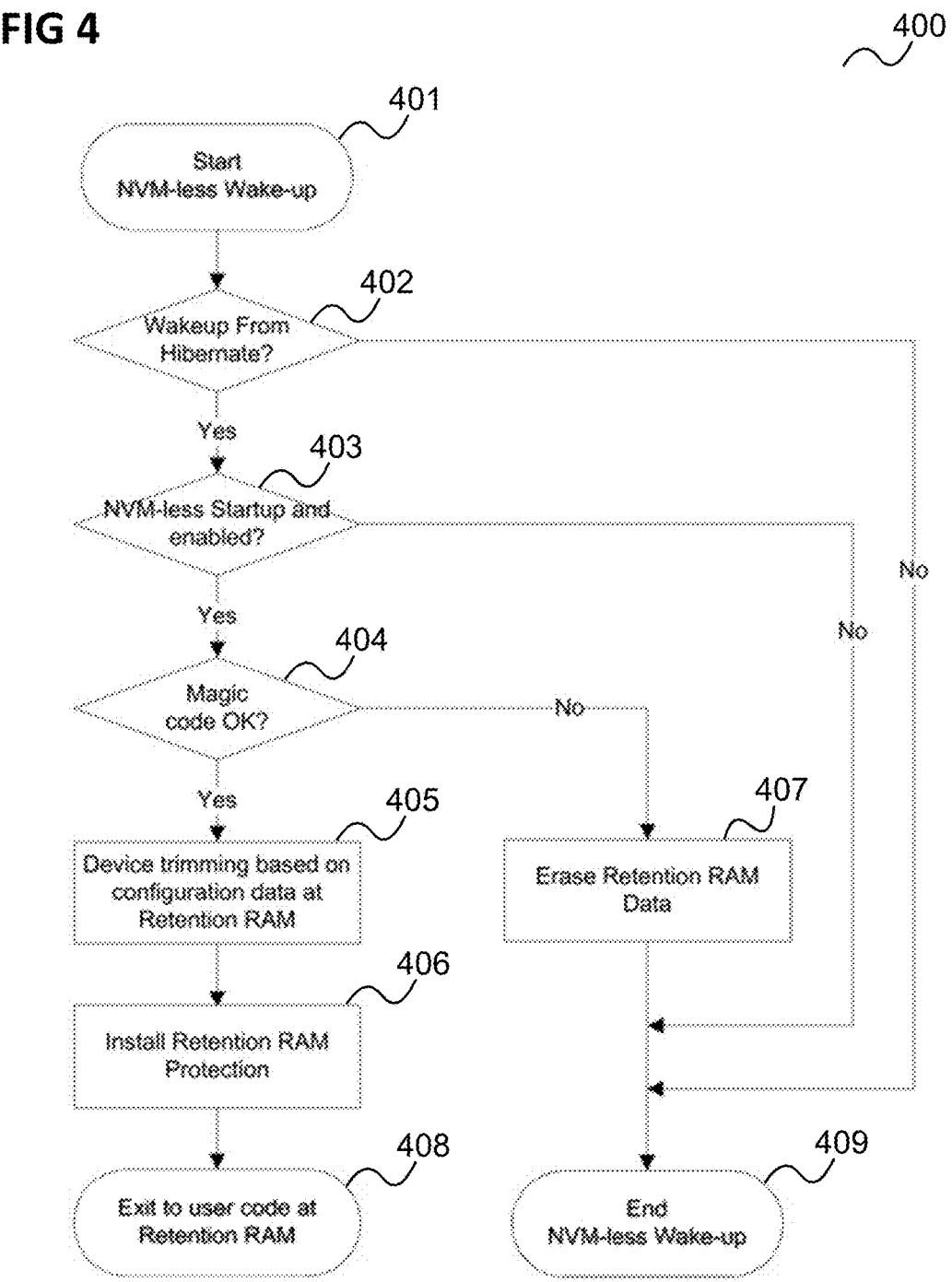
FIG. 4 shows a flow diagram illustrating a wake-up from hibernate mode.

FIG. 4 shows a flow diagram 400 illustrating the wake-up from hibernate mode.

In 401, the NVM-less wake-up process starts. If, in 402, the microcontroller 100 should not wake-up from hibernate mode (e.g. if a wake-up time 208 has not yet been reached), the NVM-less wake-up process is ended in 409. If the microcontroller 100 should wake up the hibernate controller 106 activates the CPU 103 which starts executing the boot code.

In 403, the boot code detects whether NVM-less wake up is enabled. If it is not enabled, the NVM-less wake-up process is ended in 409. If it is enabled, the boot code, in 404, searches the SRAM 102 for the magic code and checks the magic code to start the device configuration. If the magic code is not valid (e.g. is not correct for the configuration data stored in the SRAM 102), the bootcode erases the configuration data from the SRAM 102 in 407 and terminates the NVM-less wake-up process in 409.

If the magic code is valid, the boot code, in 405, installs the configuration data located in the SRAM 102 into respective registers 108, i.e. configures the microcontroller 102 according to the configuration data (including, e.g. device trimming). This device configuration is performed based on the SRAM 102, i.e. based on the configuration data stored in the SRAM 102.

In 406, after installing the configuration data the boot code performs a write-protection of the section of SRAM 102 storing the configuration data such that it cannot be modified by the user application code. Further device protection may be configured by the boot code.

In 408, the boot code passes the control of the microcontroller 100 to the user software (i.e. user application code) located in the SRAM 102.

Figure 5:
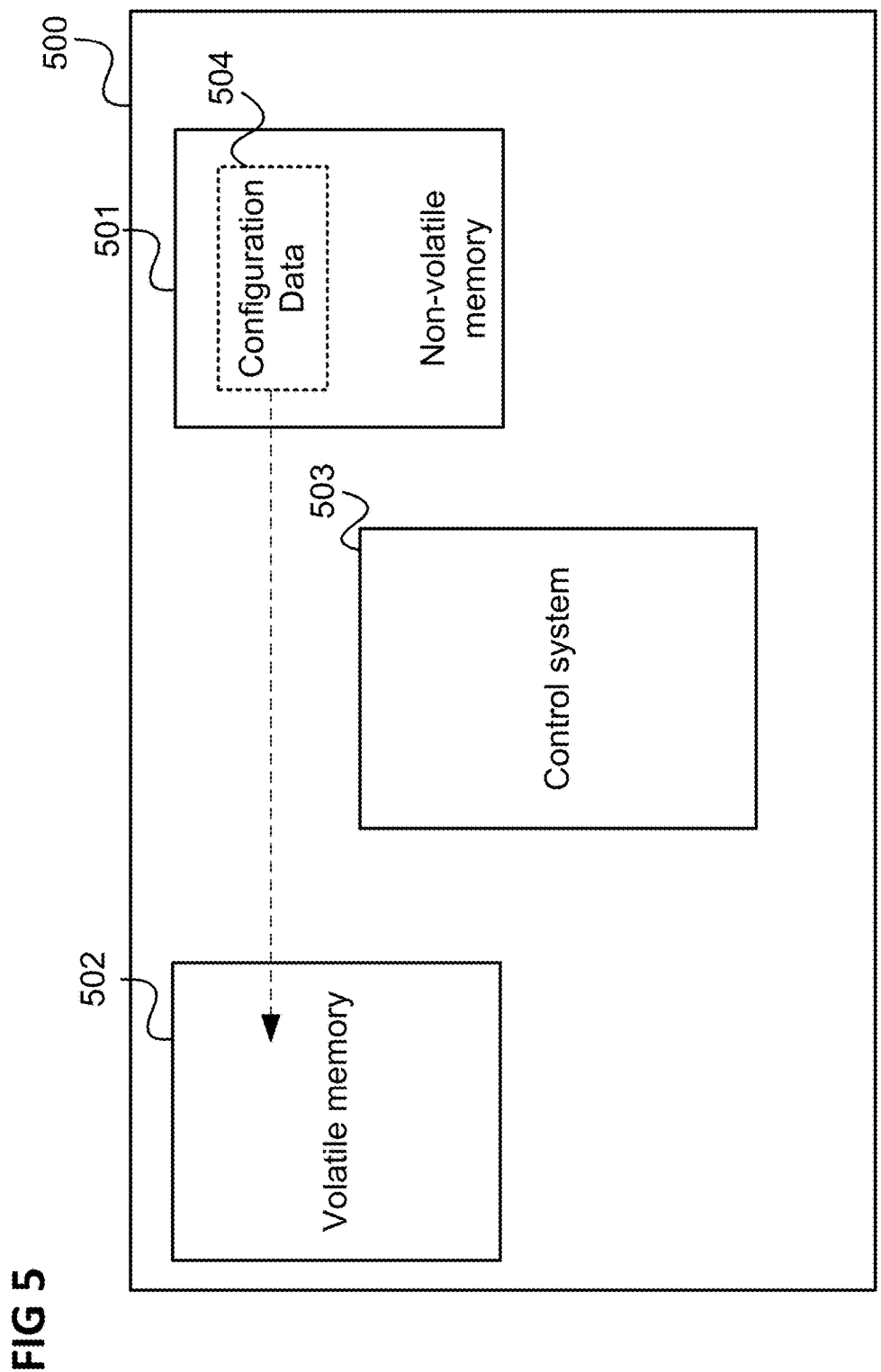
FIG. 5 shows a data processing device according to an embodiment.

In summary, according to various embodiments, a data processing device is provided as illustrated in FIG. 5.

FIG. 5 shows a data processing device 500 according to an embodiment.

The data processing device 500 includes a non-volatile memory 501 configured to store configuration data 504 for the data processing device and a volatile memory 502.

The data processing device 500 further includes a control system 503 configured to copy the configuration data from the non-volatile memory 501 to a section of the volatile memory 502, block writing to the section of the volatile memory 502, and to put the data processing device 500 into a hibernation mode in which the non-volatile memory 501 is inactive and the volatile memory 502 is active (e.g. in a data retention mode).

According to various embodiments, in other words, a data processing device has a hibernate mode in which a non-volatile memory is inactive while a volatile memory is active (i.e. keeps data stored in it). The volatile memory is used to store configuration data (and further data such as user application code) originally stored in the non-volatile memory. After hibernation mode, the data processing device may enter a non-volatile-memory-less active mode in which components like for example a processor of the data processing device are active (e.g. a processor executes a user application while it is in active, i.e. does not execute instructions, in hibernate mode) while the non-volatile memory is still inactive (e.g. cannot be accessed by the processor).

Hibernation mode can be understood as a mode in which only a small portion of a system (in this case for example wake-up event detection logic and retention memory of the data processing system) remains powered while the rest of the system is powered off.

The non-volatile memory being inactive may be understood as a state where analog circuits of the non-volatile memory like charge pumps etc. are powered off. Also an internal clock and control logic of the non-volatile memory may be powered down. Also an on-chip voltage regulator may enter power saving mode and disable generation of the non-volatile memory power supply. The non-volatile memory being inactive, e.g. corresponding of a sleep mode of the non-volatile memory may in general be implementation specific.

The volatile memory may be a regular system (or main) memory capable of retaining data during power off of the system (i.e. in hibernation mode). For example, it is a special SRAM with an internal power switch that allow a supply from a main voltage source or from an ultra low power regulator active in hibernate mode.

The approach described with reference to FIG. 5 allows a simple implementation based on a standby memory (i.e. volatile memory) write protection and boot code (e.g. stored in a read-only memory and executed by a processor). Thus, it can be implemented without special technology measures. Regarding optimization options, the wake-up (from hibernate mode) may for example be accelerated by device configuration optimization and the firmware (e.g. boot code) complexity may be optimized e.g. code performance optimization may be performed.

The configuration data, (originally) stored in the non-volatile memory which may for example contain security and product marking options can be protected and safely installed upon a wake up from hibernate mode.

Figure 6:
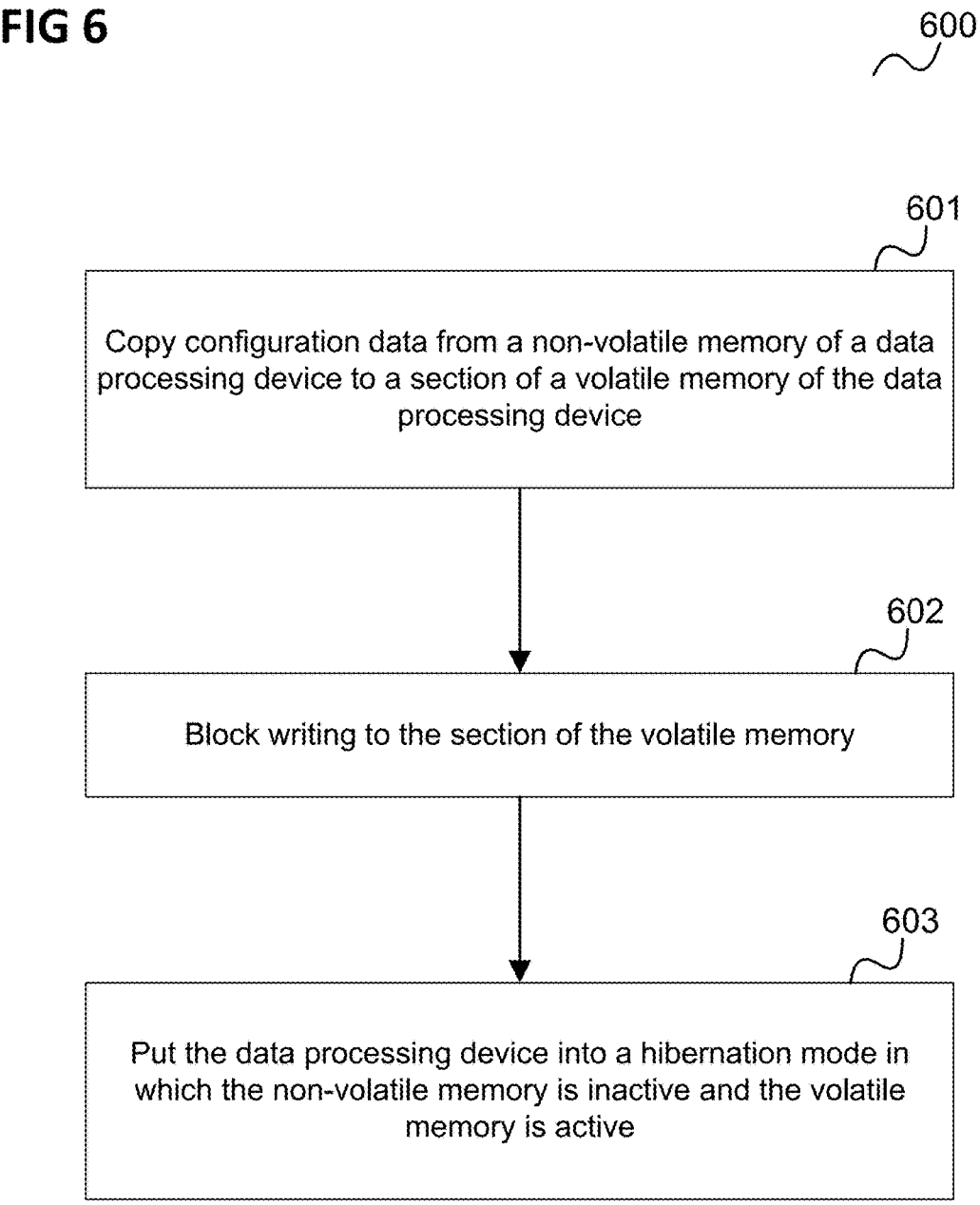
FIG. 6 shows a flow diagram illustrating a method for saving power in a data processing device according to an embodiment.

The data processing device 500 for example carries out a method for saving power in a data processing device as illustrated in FIG. 6.

FIG. 6 shows a flow diagram 600 according to an embodiment.

In 601, configuration data is copied from a non-volatile memory of a data processing device to a section of a volatile memory of the data processing device.

In 602, writing to the section of the volatile memory is blocked.

In 603, the data processing device is put into a hibernation mode in which the non-volatile memory is inactive and the volatile memory is active.

In the following, various embodiments are given.

Embodiment 1 is a data processing device as illustrated in FIG. 5.

Embodiment 2 is a data processing device of embodiment 1, wherein the volatile memory is a system memory of the data processing device.

Embodiment 3 is a data processing device of embodiment 1 or 2, wherein the volatile memory is a static random access memory.

Embodiment 4 is a data processing device of any one of embodiments 1 to 3, wherein the volatile memory being active includes the volatile memory retaining data stored in the volatile memory.

Embodiment 5 is a data processing device of any one of embodiments 1 to 4, wherein the volatile memory includes a plurality of memory cells, wherein each memory cell has a state corresponding to a bit value stored by the memory cell and the volatile memory being active includes the memory cell being powered to retain the state.

Embodiment 6 is a data processing device of any one of embodiments 1 to 5, wherein the data processing device includes a processor and the control system is further configured to put the data processing device into a non-volatile-memory-less active mode in which the non-volatile memory is inactive, the volatile memory is active and the processor is active.

Embodiment 7 is a data processing device of embodiment 6, wherein the data processing device includes a wake-up circuit configured to put the data processing device into the non-volatile-memory-less active mode in response to a wake-up event.

Embodiment 8 is a data processing device of embodiment 6 or 7, wherein the control system is configured to configure the data processing device according to the configuration data stored in the volatile memory when putting the data processing device into the non-volatile-memory-less active mode from the hibernate mode.

Embodiment 9 is a data processing device of embodiment 8, wherein the data processing device includes one or more configuration registers and the control system is configured to configure the data processing device by storing information corresponding to the configuration data in the registers.

Embodiment 10 is a data processing device of embodiment 9, wherein the registers are configured to lose their contents in hibernate mode.

Embodiment 11 is a data processing device of any one of embodiments 6 to 10, wherein the control system is configured to block writing to the section of volatile memory when putting the data processing device into the non-volatile-memory-less active mode from the hibernate mode.

Embodiment 12 is a data processing device of any one of embodiments 6 to 11, wherein in the non-volatile-memory-less active mode, the processor is configured to execute user application code stored in the volatile memory.

Embodiment 13 is a data processing device of embodiment 12, wherein the non-volatile memory is configured to store the user application code and the control system is configured to copy the user application from the non-volatile memory to the volatile memory.

Embodiment 14 is a data processing device of embodiment 13, wherein the control system is configured to copy the user application from the non-volatile memory to the volatile memory before putting the data processing device into the hibernation mode.

Embodiment 15 is a data processing device of any one of embodiments 1 to 14, wherein the control system includes a processor executing a boot code.

Embodiment 16 is a data processing device of any one of embodiments 1 to 15, including a read-only memory configured to store the boot code.

Embodiment 17 is a data processing device of any one of embodiments 1 to 16, wherein the control system includes a state machine having a first state corresponding to the hibernate mode and having a second state corresponding to a non-volatile memory-less active mode in which the non-volatile memory is inactive and a processor of the data processing device is active.

Embodiment 18 is a data processing device of any one of embodiments 1 to 17, wherein the control system is further configured to store an integrity verification value together with the configuration data in the non-volatile memory and is further configured to check the integrity of the configuration data after leaving hibernate mode based on the integrity verification value and allow configuration of the data based on whether the integrity check of the configuration data is affirmative.

Embodiment 19 is a method for saving power in a data processing device as illustrated in FIG. 6.

It should be noted that embodiments described in context of the data processing device of embodiment 1 are analogously valid for the method of embodiment 19.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A data processing device, comprising:
a non-volatile memory configured to store configuration data and user application code for the data processing device;
a volatile memory; and
a control system configured to
copy the configuration data from the non-volatile memory to a section of the volatile memory,
copy a portion of the user application code from the non-volatile memory to the volatile memory before putting the data processing device into a hibernation mode in which the non-volatile memory is inactive and the volatile memory is active,
block writing to the section of the volatile memory, and
put the data processing device into the hibernation mode.

2. The data processing device of claim 1,
wherein the volatile memory is a system memory of the data processing device.

3. The data processing device of claim 1,
wherein the volatile memory is a static random access memory.

4. The data processing device of claim 1,
wherein the volatile memory being active comprises the volatile memory retaining data stored in the volatile memory.

5. The data processing device of claim 1,
wherein the volatile memory comprises a plurality of memory cells,
wherein each memory cell has a state corresponding to a bit value stored by the memory cell and the volatile memory being active comprises the memory cell being powered to retain the state.

6. The data processing device of claim 1,
wherein the data processing device comprises a processor; and
wherein the control system is further configured to put the data processing device into a non-volatile-memory-less active mode in which the non-volatile memory is inactive, the volatile memory is active and the processor is active.

7. The data processing device of claim 6,
wherein the data processing device comprises a wake-up circuit configured to put the data processing device into the non-volatile-memory-less active mode in response to a wake-up event.

8. The data processing device of claim 6,
wherein the control system is configured to configure the data processing device according to the configuration data stored in the volatile memory when putting the data processing device into the non-volatile-memory-less active mode from the hibernate mode.

9. The data processing device of claim 8,
wherein the data processing device comprises one or more configuration registers and the control system is configured to configure the data processing device by storing information corresponding to the configuration data in the registers.

10. The data processing device of claim 9,
wherein the registers are configured to lose their contents in hibernate mode.

11. The data processing device of claim 6,
wherein the control system is configured to block writing to the section of volatile memory when putting the data processing device into the non-volatile-memory-less active mode from the hibernate mode.

12. The data processing device of claim 6,
wherein in the non-volatile-memory-less active mode, the processor is configured to execute user application code stored in the volatile memory.

13. The data processing device of claim 1,
wherein the control system comprises a processor executing a boot code.

14. The data processing device of claim 13, further comprising:
a read-only memory configured to store the boot code.

15. The data processing device of claim 1,
wherein the control system comprises a state machine having a first state corresponding to the hibernate mode and having a second state corresponding to a non-volatile memory-less active mode in which the non-volatile memory is inactive and a processor of the data processing device is active.

16. The data processing device of claim 1,
wherein the control system is further configured to store an integrity verification value together with the configuration data in the non-volatile memory and is further configured to check the integrity of the configuration data after leaving hibernate mode based on the integrity verification value and allow configuration of the data based on whether the integrity check of the configuration data is affirmative.

17. The data processing device of claim 1,
wherein the section of the volatile memory is a dedicated retention RAM.

18. The data processing device of claim 6,
wherein the control system is further configured to put the data processing device into an active mode in which the non-volatile memory is active, the volatile memory is active, and the processor is active, and
wherein the volatile memory is connected to a main voltage source and a low power voltage source and configured to receive power from the main voltage source when the data processing device is in the active mode and receive power from the low power voltage source when the data processing device is in the hibernation mode.

19. The data processing device of claim 18, wherein the volatile memory is further configured to receive power from the low power voltage source when the data processing device is in the non-volatile-memory-less active mode.

20. A method for saving power in a data processing device having a volatile memory and a non-volatile memory, the method comprising:

copying configuration data from the non-volatile memory to a section of the volatile memory;

copying a portion of user application code from the non-volatile memory to the volatile memory before putting the data processing device into a hibernation mode in which the non-volatile memory is inactive and the volatile memory is active;

blocking writing to the section of the volatile memory; and putting the data processing device into the hibernation mode.

* * * * *